Figure 6:
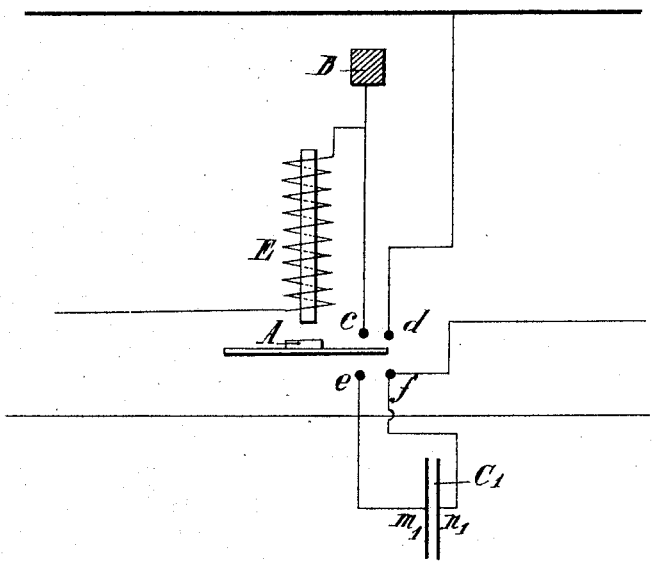

No. 632,543. Patented Sept. 5, 1899.
E. VEDOVELLI.
SYSTEM OF ELECTRIC TRACTION.
(Application filed May 29, 1897.)
(No Model.) 17 Sheets—Sheet 1.
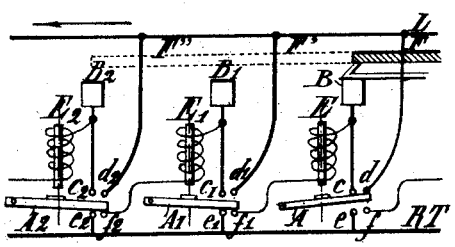
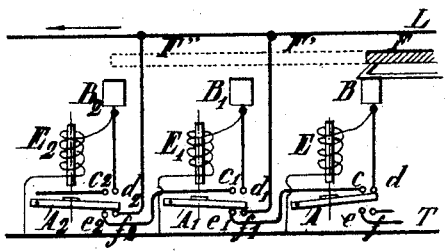
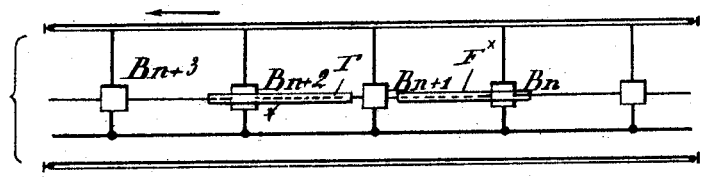
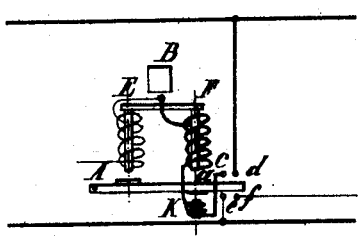
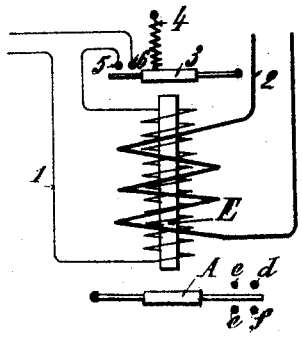
INVENTOR
Edouard Vedovelli
BY
ATTORNEYS.

No. 632,543. Patented Sept. 5, 1899.
E. VEDOVELLI.
SYSTEM OF ELECTRIC TRACTION.
(Application filed May 29, 1897.)

(No Model.) 17 Sheets—Sheet 2.

No. 632,543. Patented Sept. 5, 1899.
E. VEDOVELLI.
SYSTEM OF ELECTRIC TRACTION.
(Application filed May 29, 1897.)
(No Model.) 17 Sheets—Sheet 3.
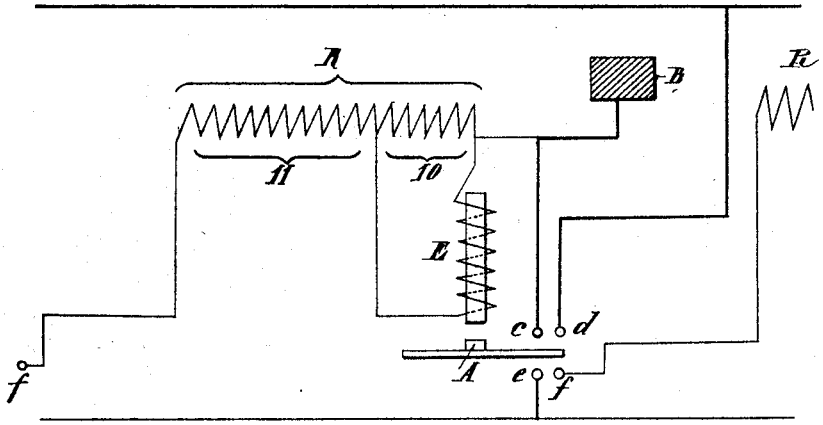
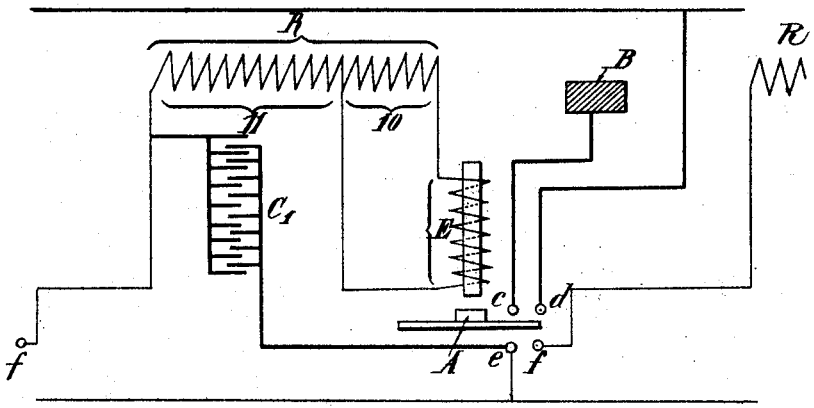
WITNESSES
Geo. W. Jackel.
William B. Roberts.
INVENTOR
Édouard Vedovelli
BY
ATTORNEYS.

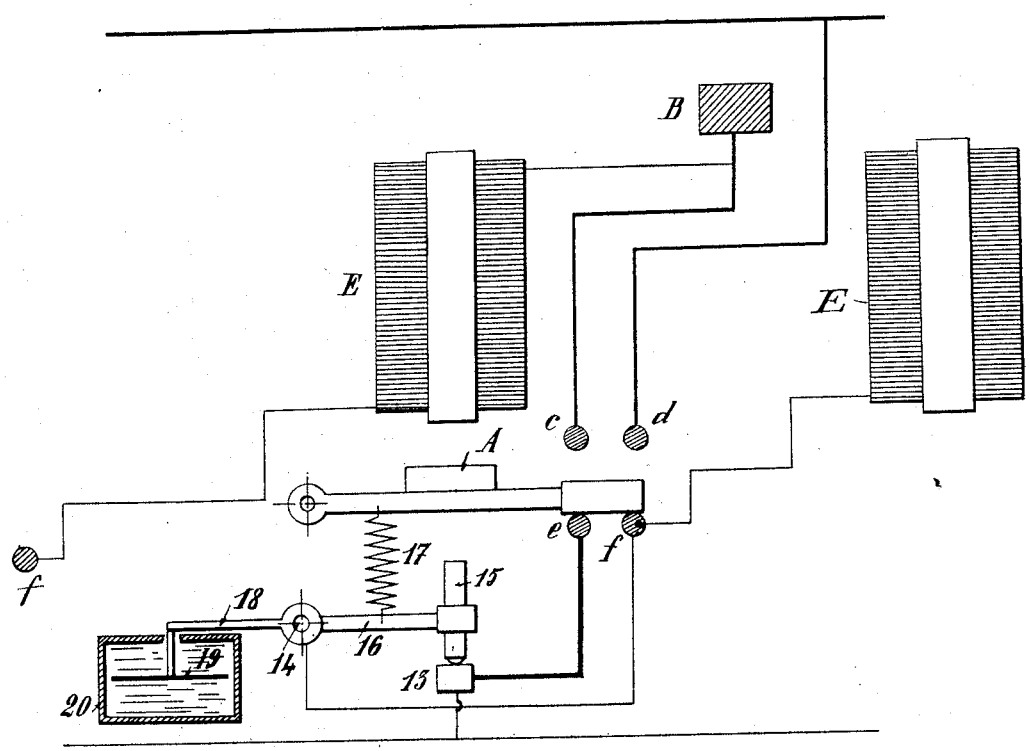

No. 632,543. Patented Sept. 5, 1899.
E. VEDOVELLI.
SYSTEM OF ELECTRIC TRACTION.
(Application filed May 29, 1897.)
(No Model.) 17 Sheets—Sheet 5.

WITNESSES:
Geo. W. Jackel
William B. Roberts

INVENTOR
Edouard Vedovelli
BY Goepel & Raegener
ATTORNEYS.

No. 632,543. Patented Sept. 5, 1899.
E. VEDOVELLI.
SYSTEM OF ELECTRIC TRACTION.
(Application filed May 29, 1897.)
(No Model.) 17 Sheets—Sheet 6.
FIG.14
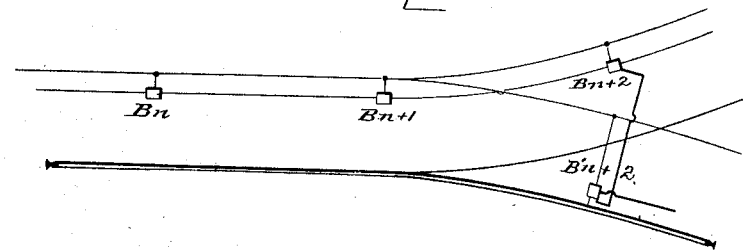
FIG.15
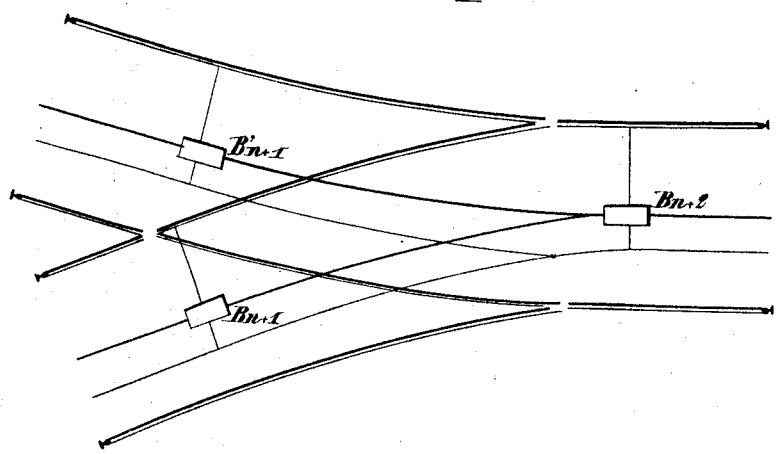
FIG.16      FIG.17
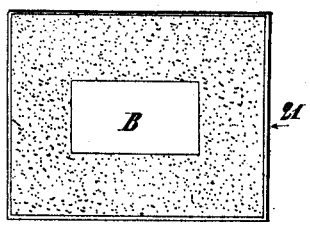 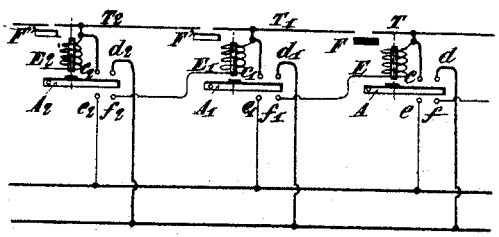
WITNESSES:
Geor. Jaekel
William B. Roberts
INVENTOR
Edouard Vedovelli
BY Goepel & Raegener
ATTORNEYS.

No. 632,543. Patented Sept. 5, 1899.
E. VEDOVELLI.
SYSTEM OF ELECTRIC TRACTION.
(Application filed May 29, 1897.)
(No Model.) 17 Sheets—Sheet 7.
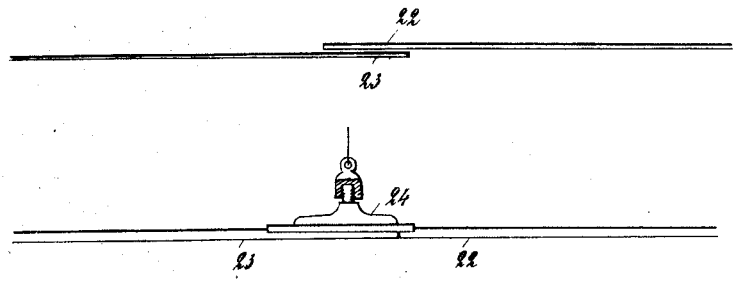
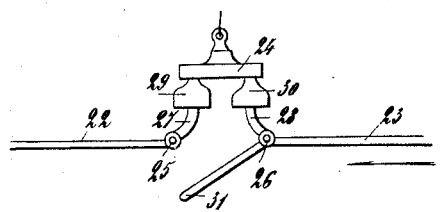
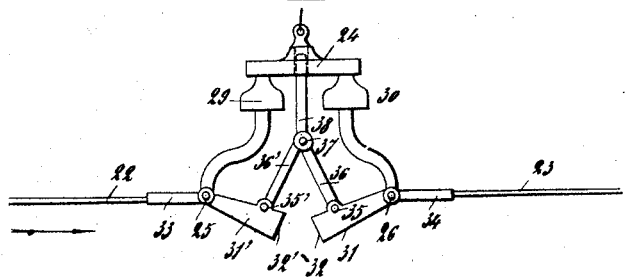
WITNESSES:
INVENTOR
Edouard Vedovelli
BY
ATTORNEYS.

No. 632,543. Patented Sept. 5, 1899.
E. VEDOVELLI.
SYSTEM OF ELECTRIC TRACTION.
(Application filed May 29, 1897.)
(No Model.) 17 Sheets—Sheet 8.

WITNESSES:
Geore Jaelel.
William B. Roberts.

INVENTOR
Edouard Vedovelli
BY
ATTORNEYS.

No. 632,543. Patented Sept. 5, 1899.
E. VEDOVELLI.
SYSTEM OF ELECTRIC TRACTION.
(Application filed May 29, 1897.)
(No Model.) 17 Sheets—Sheet 9.
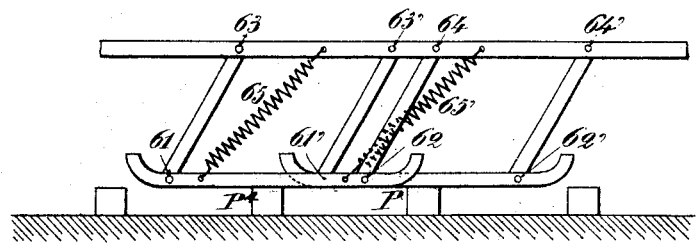
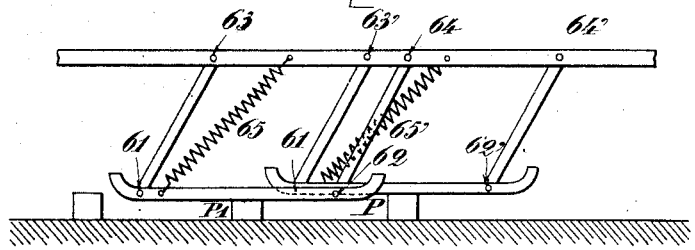
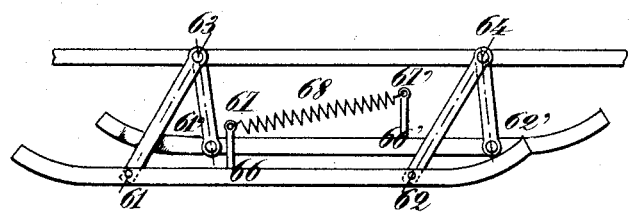
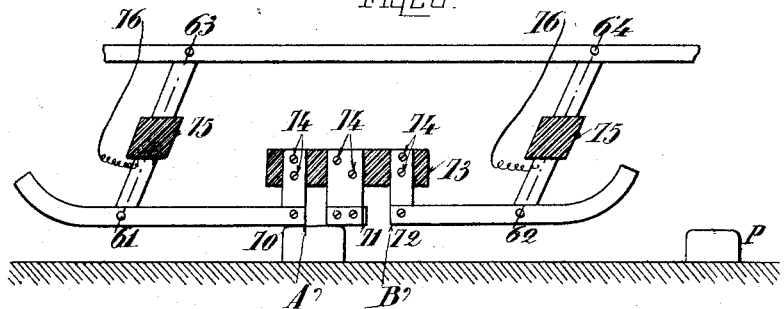
WITNESSES:
Geo. R. Jaekel.
William B. Roberts.
INVENTOR
Edouard Vedovelli
BY Greenfield & Gregory
ATTORNEYS.

No. 632,543. Patented Sept. 5, 1899.
E. VEDOVELLI.
SYSTEM OF ELECTRIC TRACTION.
(Application filed May 29, 1897.)
(No Model.) 17 Sheets—Sheet 10.
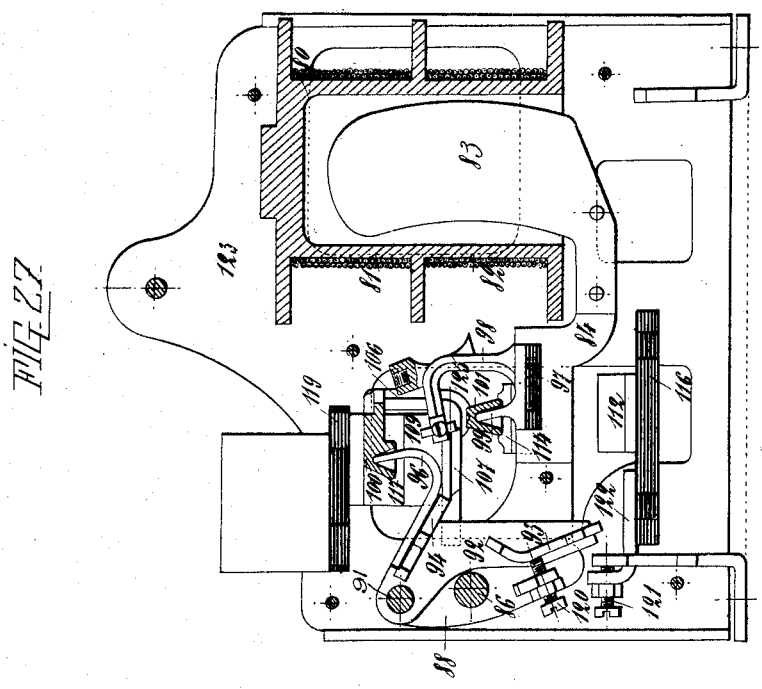
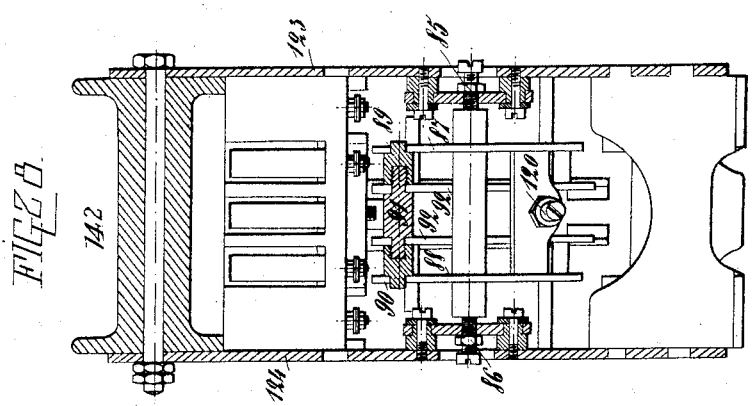
WITNESSES:
Geo. B. Jaekel
William B. Roberts
INVENTOR
Édouard Vedovelli
BY
ATTORNEYS.

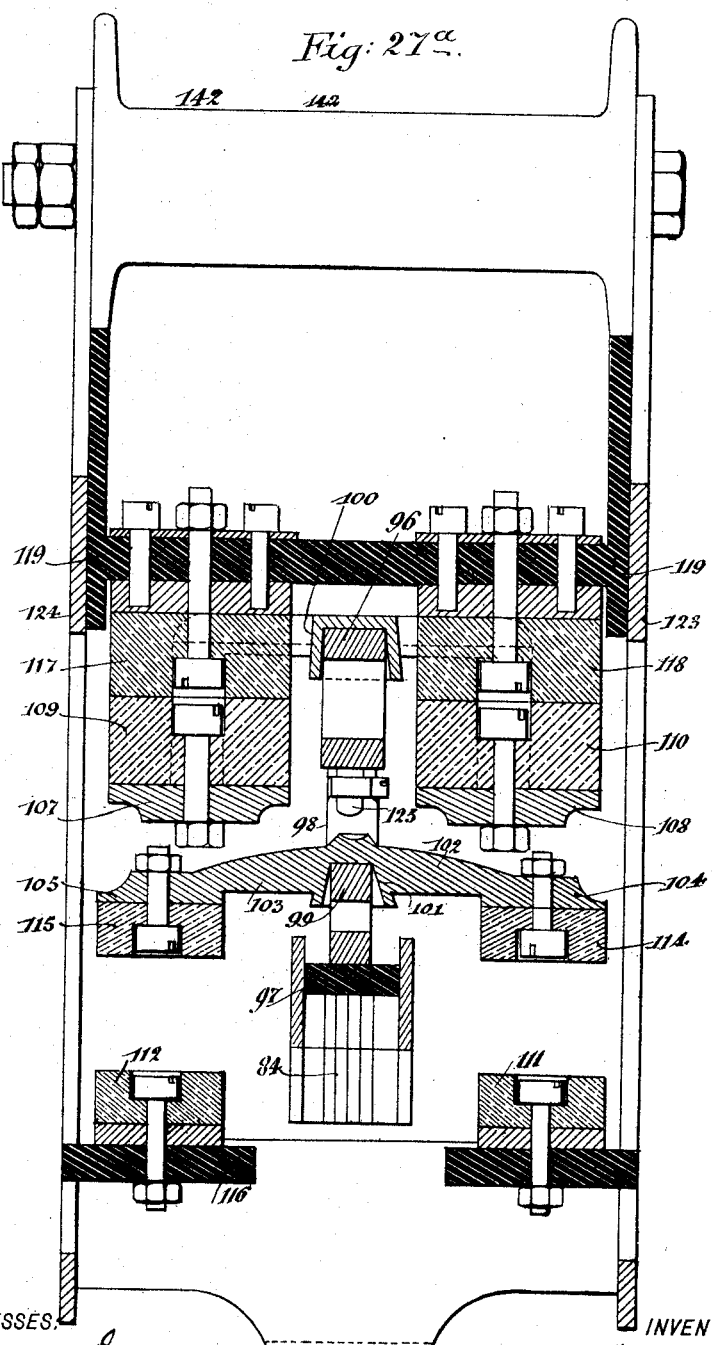

No. 632,543. Patented Sept. 5, 1899.
E. VEDOVELLI.
SYSTEM OF ELECTRIC TRACTION.
(Application filed May 29, 1897.)
(No Model.) 17 Sheets—Sheet 12.

No. 632,543. E. VEDOVELLI. Patented Sept. 5, 1899.
SYSTEM OF ELECTRIC TRACTION.
(Application filed May 29, 1897.)
(No Model.) 17 Sheets—Sheet 13.
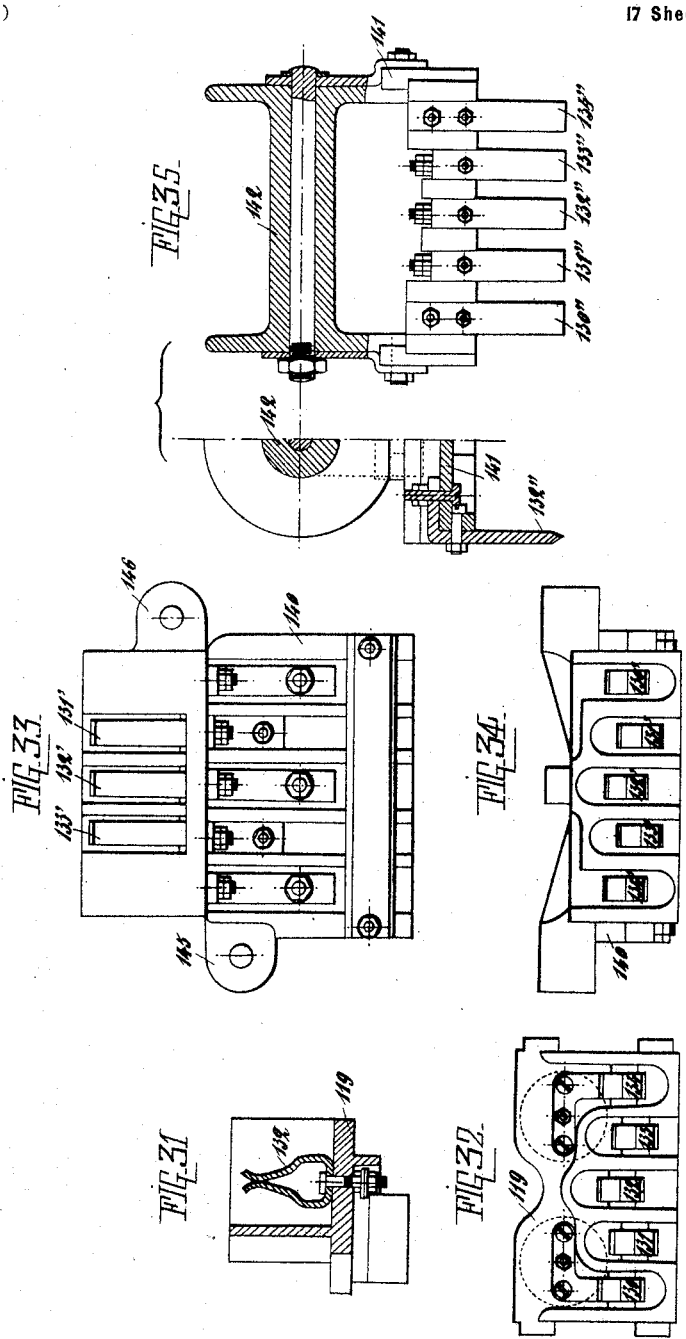

No. 632,543. Patented Sept. 5, 1899.
E. VEDOVELLI.
SYSTEM OF ELECTRIC TRACTION.
(Application filed May 29, 1897.)
(No Model.) 17 Sheets—Sheet 14.
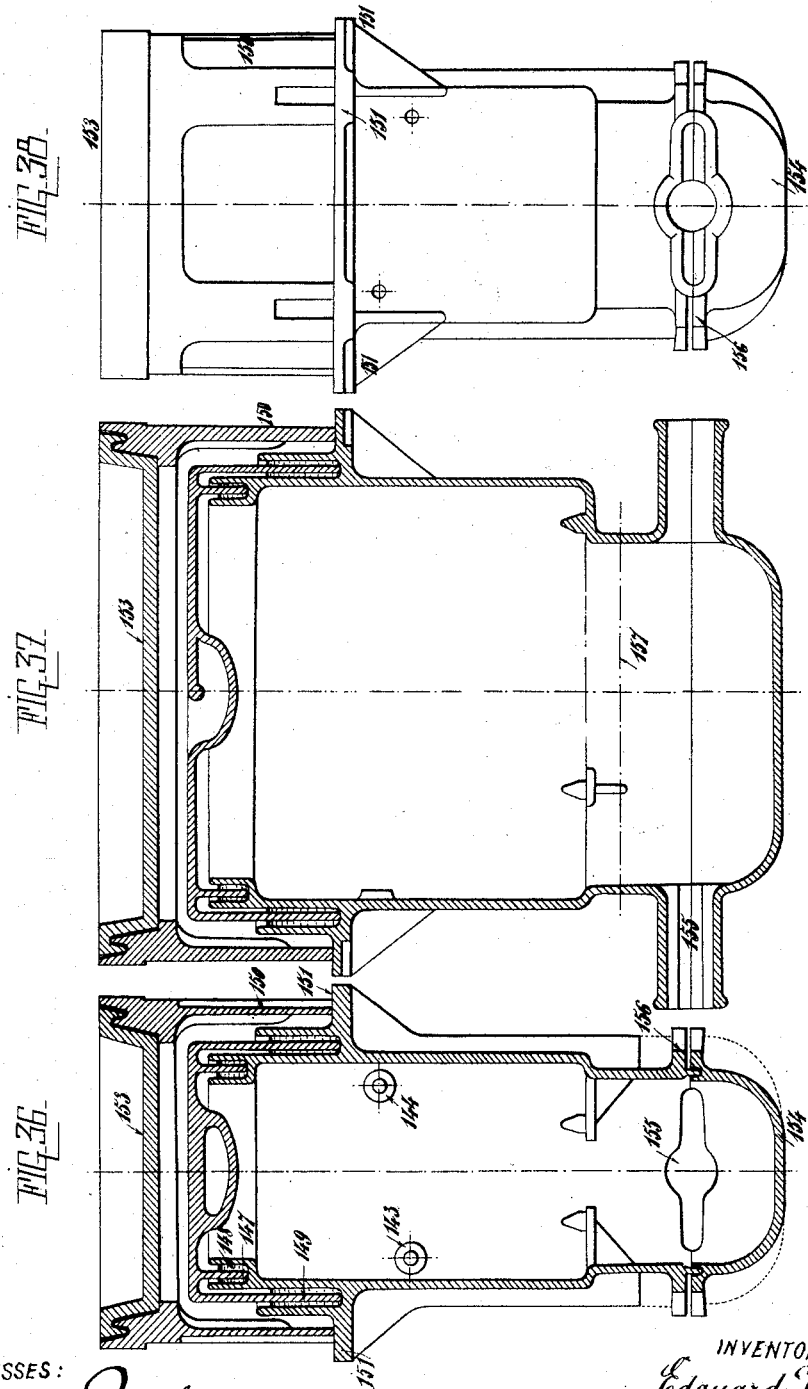
WITNESSES:
Geo. W. Jackel.
William D. Roberts.
INVENTOR
Edouard Vedovelli
BY Goepel & Raegener
ATTORNEYS.
THE NORRIS PETERS CO., PHOTO-LITHO., WASHINGTON, D. C.

No. 632,543. Patented Sept. 5, 1899.
E. VEDOVELLI.
SYSTEM OF ELECTRIC TRACTION.
(Application filed May 29, 1897.)
(No Model.) 17 Sheets—Sheet 15.
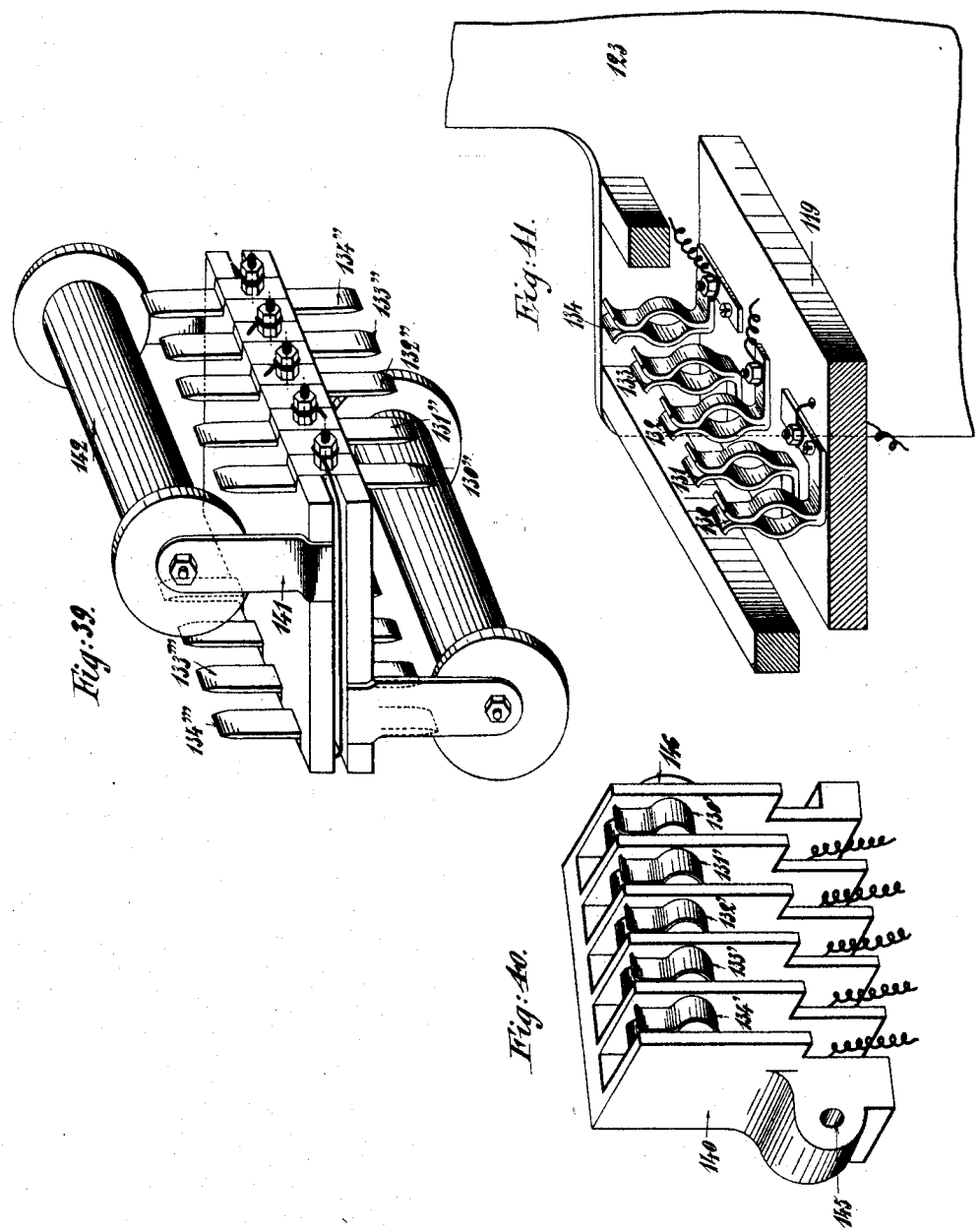

No. 632,543. Patented Sept. 5, 1899.
E. VEDOVELLI.
SYSTEM OF ELECTRIC TRACTION.
(Application filed May 29, 1897.)
(No Model.) 17 Sheets—Sheet 16.
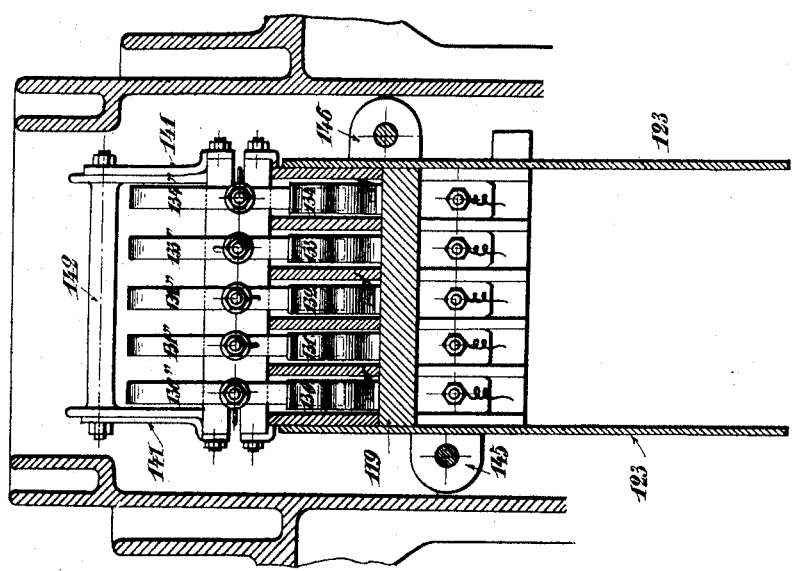
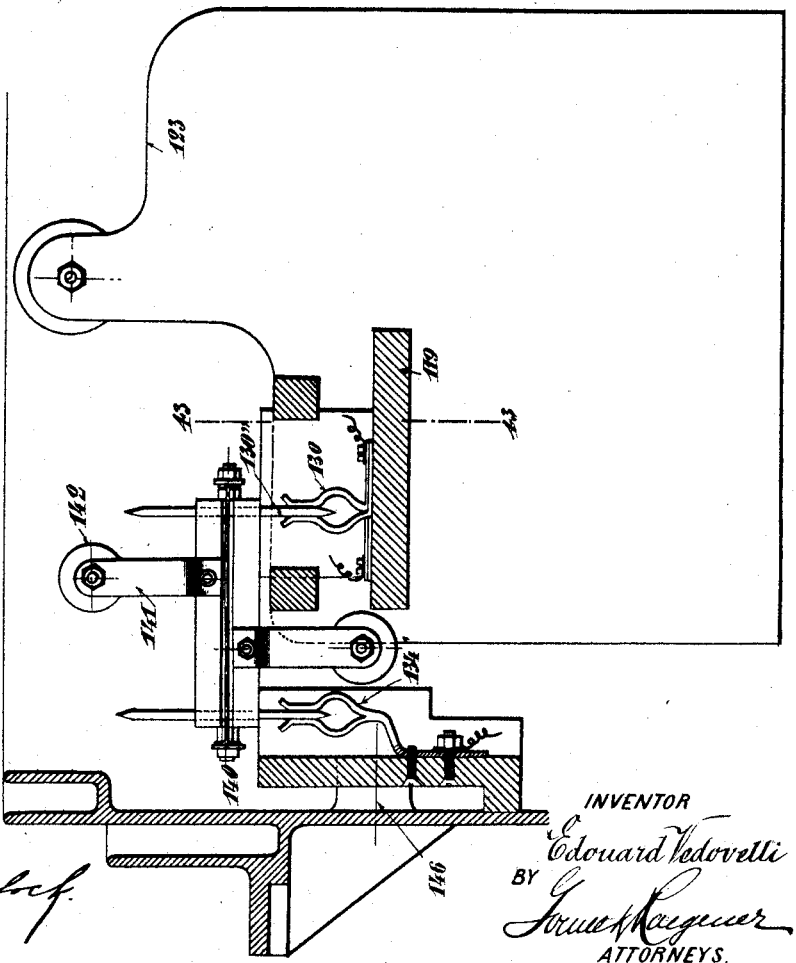

No. 632,543. Patented Sept. 5, 1899.
E. VEDOVELLI.
SYSTEM OF ELECTRIC TRACTION.
(Application filed May 29, 1897.)
(No Model.) 17 Sheets—Sheet 17.
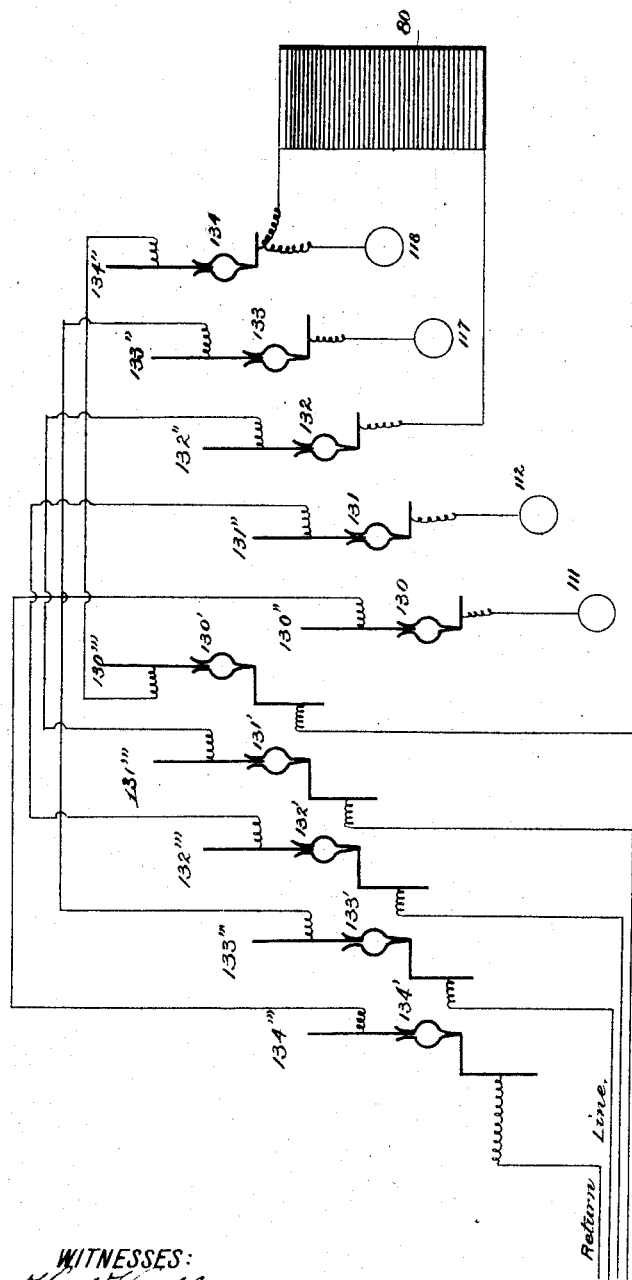

UNITED STATES PATENT OFFICE.

EDOUARD VEDOVELLI, OF PARIS, FRANCE.

SYSTEM OF ELECTRIC TRACTION.

SPECIFICATION forming part of Letters Patent No. 632,543, dated September 5, 1899.

Application filed May 29, 1897. Serial No. 638,692. (No model.)

*To all whom it may concern:*

Be it known that I, EDOUARD VEDOVELLI, a citizen of France, residing at Paris, France, have invented certain new and useful Improvements in Electric Traction and in Apparatus Employed Therein, (for which I have received Letters Patent in France, No. 259,256, dated August 28, 1896,) of which the following is a specification.

The present invention relates to an improved system of electric traction and to apparatus employed therein. Let it first be assumed that it is applied to an underground line.

In the system according to the present invention metal blocks are arranged between the rails at regular intervals, and the car is provided with a special contact, the length of which is a little greater than that between two successive blocks. The rails are connected to each other and then to one pole of a dynamo, the other pole of which is successively connected with each of the blocks when the car passes over them. The result of this arrangement is that the current enters a block only when it is covered by the car. In this system each block supplies current to itself, and as one block after the other comes into circuit it cuts off the current from the preceding one.

The invention will be better understood with reference to the accompanying drawings, in which are represented, by way of example, the various parts of the system of electric traction according to the present invention.

Figure 7:
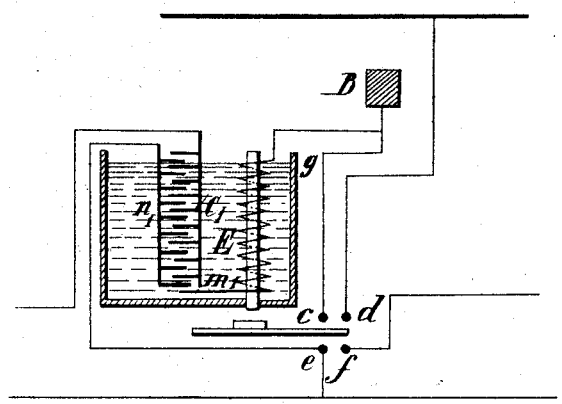
Figure 11:
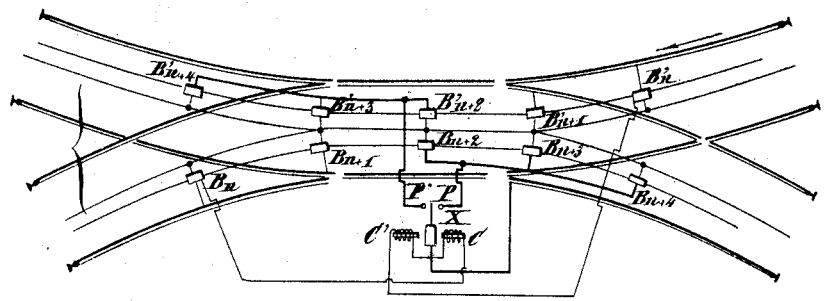
Figure 12:
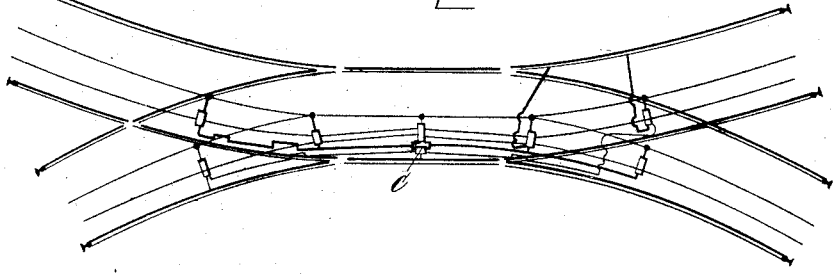
Figure 13:
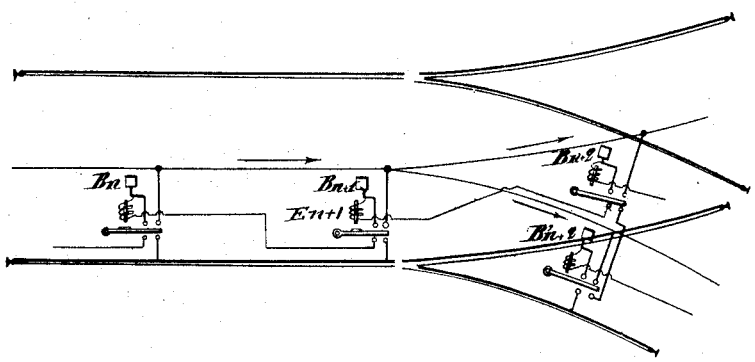
Figure 21:
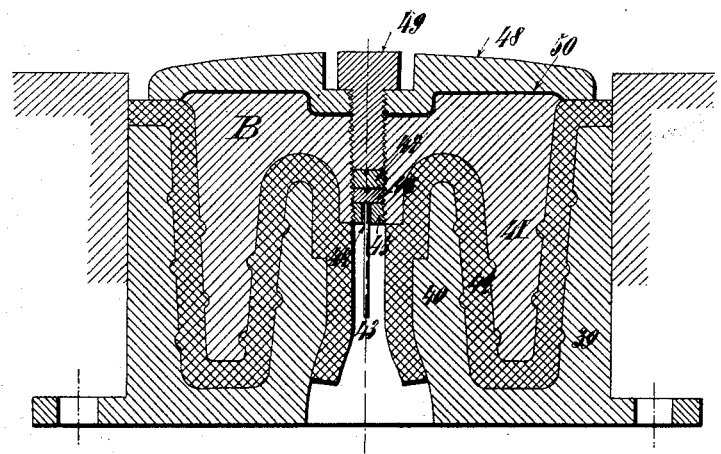
Figure 22:
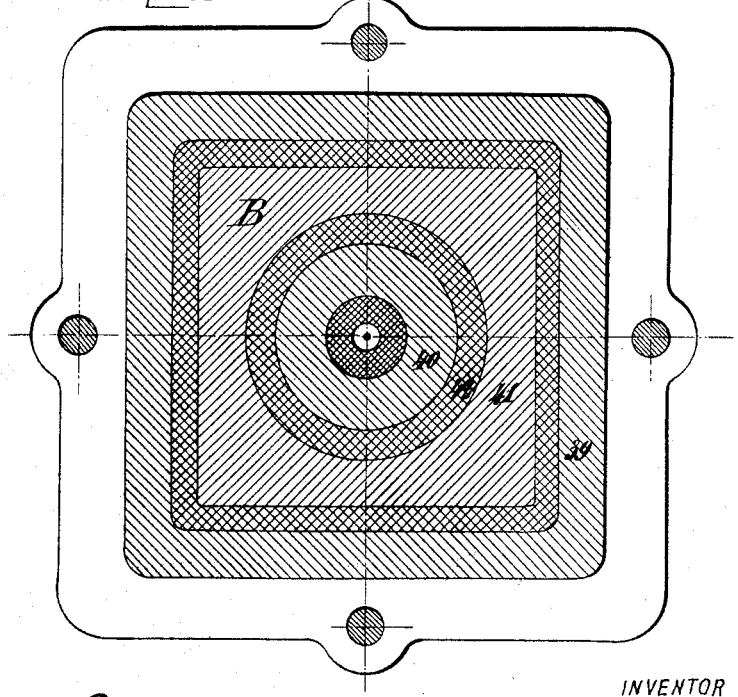
Figure 29:
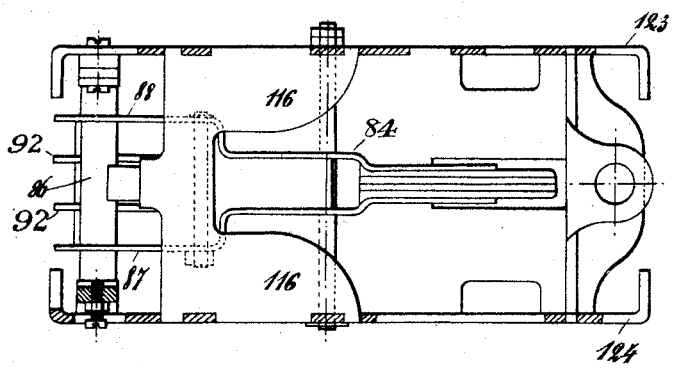
Figure 30:
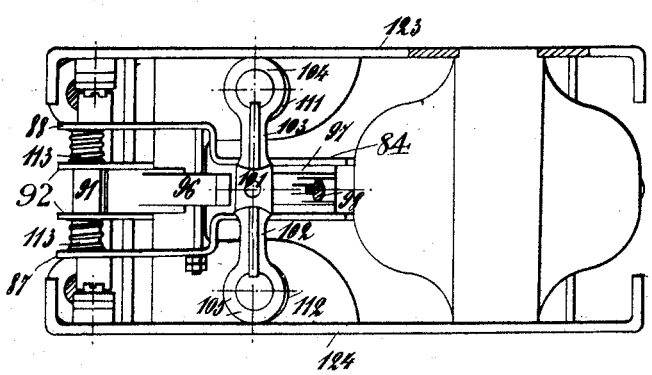

Figure 1 is a diagrammatic view showing my system in its preferred form. Fig. 2 is a diagrammatic view showing only the rails, line-wire, blocks, and connecting-wires. Fig. 3 is a diagrammatic view of a modification of the preferred form of my invention. Fig. 4 shows a form of automatic cut-out with which the switch of each contact is provided. Fig. 5 shows a modified form of automatic cut-out. Fig. 6 shows the switch provided with a condensing device which absorbs the extra current caused by rupture which would produce sparking. Fig. 7 is a view illustrating the preferred manner of insulating and protecting the condenser. Fig. 8 is a view showing a resistance applied to the switch in such manner as that high-tension currents may be properly employed. Fig. 9 shows both a condenser and a resistance applied to the switch. Fig. 10 shows the inclusion with the switch of means for breaking the contact very slowly. Fig. 11 shows the system applied to parallel lines in which it is necessary, as in narrow places, that the cars pass over the same line. Fig. 12 is a diagram showing a modification of the latter. Figs. 13 and 14 are diagrammatic views showing the system applied to lines which branch off into two. Fig. 15 is a diagram showing the system applied to two lines which merge into one. Fig. 16 is a plan view showing the manner in which the accidental connection of one of the blocks with the source of electricity is prevented. Fig. 17 is a diagrammatic view showing modifications by which the system is adapted to overhead lines. Fig. 18 illustrates details of two adjacent insulated portions of the wire in an overhead line. Fig. 19 is a modification of the latter. Fig. 20 is a further modification adapted for a trolley passing in both directions. Figs. 21 and 22 are respectively vertical and transverse sections of one of the blocks. Figs. 23 to 26, inclusive, illustrate various forms of contact-pieces to be carried by the car. Fig. 27 is a front elevation of the preferred form of switch. Fig. 27$^a$ is a transverse section of the same through the carbon blocks. Fig. 28 is a side elevation thereof in section. Fig. 29 is an under side view of the switch. Fig. 30 is a plan view of the same, parts being removed. Figs. 31, 32, 33, 34, and 35 show certain details of the switch apparatus. Figs. 36, 37, and 38 show, respectively, in vertical transverse section, in vertical longitudinal section, and in side elevation a box in which the switch may be placed. Fig. 39 is a perspective view of the connector adapted to quickly permit the desired connections at the interior of the switch mechanism. Fig. 40 represents in perspective the block which carries the plugs, with each of which one of the five wires which communicate with the switch is connected. Fig. 41 represents a perspective view of some of the other plugs with which are connected different parts of the switch. Fig. 42 is a transverse section showing the connector in position so that the two series of plugs are connected. Fig. 43 is a section on the line 43 43 of the last figure, and Fig. 4A is a diagrammatic view showing in detail the connection of the apparatus and the facility with which the cars can be moved in reverse direction by simply reversing the connector.

Similar letters and figures of reference indicate corresponding parts in the various figures.

Next to each block B B' B² there is arranged an electromagnet E E' E², having a coil of fine wire, Fig. 1. One end of the wire of each electromagnet is permanently connected to its corresponding block—say B—the other end being connected to a contact $f'$, placed near the next block—say B'—for the purpose hereinafter described. The current enters the conductor L, which is successively connected to the contacts $d\ d'\ d^2$. The return R T is connected to another series of contacts $e\ e'\ e^2$. The blocks B B' B² are respectively connected to the contacts $c\ c'\ c^2$. The free end of the armature of each electromagnet E E' E² can move between the four contacts $c\ d\ e\ f$, which are placed on either side of it, the arrangement being such that the armature can connect together electrically either the two contacts $c$ and $d$ or the two contacts $e$ and $f$. Normally—that is to say, when no car passes over the blocks—the armatures A A' A² are respectively on the contacts $e\ f\ e'\ f'\ e^2\ f^2$. Let it be assumed that the contact F of the car is excited—that is to say, connected to the line-wire L—and that the car advances till the contact F comes in contact with the first block B. At this moment the shunt-circuit of the electromagnet E will be closed, a current will enter it and cause the armature to be attracted. The latter, leaving the two contacts $e\ f$, will make contact with $c$ and $d$. The current thus directly enters the block and passes from the same to the motor or the car, which latter will therefore advance. When the contact F comes during the advance of the car in contact with the block B', (position F', dotted in Fig. 1,) the same thing will occur again. The shunt-circuit of the electromagnet E' will be closed, the armature A' will be attracted, the electric connection between $e'$ and $f'$ will be interrupted, and $c'$ will be connected with $d'$. The results of this movement of the armature will be as follows: First, the two contacts $e'\ f'$ being no longer electrically connected, the circuits of the electromagnet E will be open and the armature A will fall back on the contacts $e$ and $f$, and the contacts $c$ and $d$ being no longer connected consequently the block B will no longer be electrically connected to the line; second, the connection of the contacts $c'\ d'$ by means of the armature A' results in the current entering the block B' in the same manner as described with reference to the first block B; and the current ceases to enter the block B as soon as it enters the block B'. When the car continues to move and the contact F comes into the position F², the same operation takes place again. The block B² will come into circuit, the current will be cut off from the block B', and, besides the phenomena already described, it must be pointed out that the armature A' in returning into its initial position will again connect the electromagnet E to earth, and all the parts in combination with the first block B will be ready to work again under the same conditions when another car passes over.

The electric connections between the different parts may be altered, for instance, as indicated in Fig. 3, without departing from the spirit of the present invention. In this latter modification, referring, say, to the block B', the electromagnet E' is in shunt-circuit, being connected on one side to the block and on the other permanently to the earth. When the contact F comes into the position F', the armature A' is attracted and connects the two contacts $c'\ d'$, one of which, $d'$, is connected to the block B' and the other, $c'$, with the contact $e^2$ of the block B². In this latter block B² the armature A² is in its lower position, and consequently connects the two contacts $e^2$ and $f^2$. The result of this is that the armature A', being attracted, establishes connection between the block B' and the source of electricity, as the contact $f^2$ of the next block is permanently connected to the source of electricity. When the contact moves from the position F' to F², the same operations take place. The armature A² will be attracted, the contacts $c^2$ and $d^2$ will be connected, and the connection between the contacts $e^2$ and $f^2$ being interrupted, the block B', through which the current passed up to that moment by means of the two latter contacts, will have the current entering only through the contact-piece F, so that when the latter advances and leaves the block B' the electromagnet E, no longer having the current passing through it, will fall again, and the same operation will again take place as for the first block.

To simplify matters, everything hereinafter described will be supposed to operate on the first system described, although of course it will equally well apply to the second system.

The switch of each contact is provided with an automatic cut-out, Fig. 4. If $i$ is the maximum strength of current required for working the car, it is advisable to have a switch which would prevent any current of strength greater than a certain determined strength I from passing. This is effected in the following manner: The electromagnet E is of soft iron and of horseshoe shape. On one of the legs is a coil of fine wire, the other leg having a thick-wire coil and connecting the block B with the contact $c$. The latter coil is wound in opposite direction to the fine-wire coil. Let $j$ be the strength of the current in the fine-wire coils of the electromagnet E and their number N. It will then be easily understood that if we make $n$ the number of windings on the branch F, $\dfrac{Nj}{I} = n$ then when a current of the strength I passes through the thick-wire coil there will be equilibrium between the two branches, the armature will no longer be attracted, and will fall and interrupt communication between the contacts $c$ and $d$; but as it might happen by reason of a slight error in the equilibrium $Nj = N I$ or from some other cause that the armature does not fall another electromagnet K is placed in series with the first one F and upon the opposite side of the armature, which magnet will act and strongly attract the armature, so as to produce a very sudden rupture at the contacts $c$ and $d$. Any other device may also be used, either with coils wound in the opposite or in the same direction—such, for instance, as follows: On a single-bar electromagnet E, Fig. 5, are wound two wires 1 and 2. A is the armature for closing the contacts. 3 is another auxiliary armature held at a distance from the core of the electromagnet by a suitable device—such, for instance, as a spring 4. This latter auxiliary armature is such that normally, whether there be any current in the electromagnet or not, it is not attracted thereby, but connects the two contacts 5 and 6 inserted in the fine-wire coil 1 of the electromagnet E. If the current becomes too strong in the thick-wire coil 2, the armature 3 will be attracted and will break the fine-wire circuit of the electromagnet E. The armature A is held in its position by the magnetic action produced by the thick-wire coil of the electromagnet E, which action ought to be quite sufficient; but the armature A will certainly fall down when the current ceases to circulate in the thick-wire coil 2.

The two devices described are used as automatic cut-outs; but they serve also for the following purpose: Supposing that the contact-piece of the car reaches a block $B_{n+2}$, Fig. 2, and that no contact takes place between the two, this block will not come into circuit, but the car will continue to advance and will thus uncover the block $B_{n+1}$, which is still excited. In order to avoid this drawback, the car is provided, besides the contact F, with another contact $P^x$, (see full lines, Fig. 2,) permanently connected to the return-wire through the wheels of the car, said second contact having a resistance R, which is such that the strength of the current which flows in the circuit when this second contact comes in contact with the block shall be as nearly as possible equal to intensity of the main current. At this moment the block will automatically become inoperative. As will be seen from the preceding, the switches in the present system of electric traction are operated by a shunt-current.

When the armature A has been attracted, the contacts $e$ and $f$ are interrupted and a spark of an extra current is produced. In order to avoid the injurious effects of the extra current, the following device is used: The spark appears between the points $e$ and $f$. (See diagrammatic view of the switch, Fig. 6.) A condenser C' of suitable capacity is employed, and one side $m'$ of said condenser is joined to the terminal $e$ and the other side $n'$ to the terminal $f$. At the moment when the armature A is attracted and the points $e$ and $f$ disconnected the condenser will become charged, thus preventing the extra current from having any dangerous effect. When the armature A falls again, the condenser will be short-circuited.

The condenser may have any suitable shape, so that it may be properly insulated and protected. It may, for instance, be placed in an oil-bath. On the other hand, an important consideration for preserving the coils is to keep them well insulated. For this purpose the following arrangement (represented in Fig. 7) may be adopted: The electromagnet E and the condenser C' are both placed in a vessel $g$ filled with oil, the side $m'$ of the condenser being connected with the fine wire, which connects the end of the coil to the next switch, and the discharge end of the condenser is connected to the terminal $e$, which in turn is connected to earth. When the circuit of the electromagnet E is interrupted, the condenser will absorb the extra current and the coil will be protected. Any similar arrangement may be used instead of that above described.

When high-tension currents are used, it becomes difficult to make an electromagnet with fine-wire coils, for the difference of potential between the single coils becomes very great. This difficulty is overcome in the following manner: A resistance R, Fig. 8, without self-induction is used, the two ends of the coil of the electromagnet E being placed in shunt-circuit with a portion 10 of said resistance. The resistances of the portions 10 and 11 and the resistance of the coil and of the electromagnet E are so computed that the current passing through said electromagnet produces sufficient attraction. One end of the resistance R is connected to the block B and the other to the next following switch. The circuit thus formed will have the minimum self-induction possible. This arrangement may be combined with a condenser, which is then arranged at the end of the resistance 11, the other side of said condenser being connected to the earth, as shown in Fig. 9. Moreover, if necessary, the electromagnet E, the resistance R, and the condenser C' may be placed into an oil-bath. On the other hand, to avoid extra currents it is sufficient to break the contacts very slowly. To obtain this result, the following arrangements are used: At the points $e$ and $f$ terminate two wires, one of which is connected to a fixed carbon block 13, Fig. 10, and the other to a lever 16, which is fulcrumed at 14 and which carries at one end a carbon point 15, pressing against the carbon block 13. The lever 16 is connected to the armature A by a spring 17, so that when the armature is attracted the spring causes the lever 16 to interrupt contact between 15 and 13. From the opposite end of the lever 16 is suspended a rod 18, which carries at its end a disk 19, dipping into a bath 20, of glycerin, mercury, or other suitable substance.

The manner of working will now be easily understood. When the circuit is closed, the electromagnet E attracts the armature, which establishes communication between $c$ and $d$ and supplies the current directly to the block B. At this moment the current which supplied the preceding switch through the intermediary of the contacts $e$ and $f$ is still flowing, but passes through the carbons 13 and 15; but then the armature A, through the spring 17, pulls the lever 16 upward. This movement cannot be effected very quickly, owing to the resistance of the liquid of the receptacle 20 to the disk 19. It will be easily understood that with a disk of suitable diameter and shape the contact between the carbons 13 and 15 will be interrupted as quickly or slowly as desired.

The present invention may be applied in practice whatever be the system of electric traction used, whether single or double line, &c. Hereinafter will be described, first, a practical arrangement for cases when two distinct parallel lines are used, one for traveling in one direction and the other for returning, there being some narrow places in which it becomes necessary to let the cars pass over the same line, and, secondly, an arrangement for a line branching off into two lines and for two lines merging in one. To facilitate the description, the indices 1 will be used to indicate blocks and apparatus for the line on which cars move in one direction, the blocks and apparatus used for the other line keeping the same signs as hereinbefore. Thus, if $B_n$ $b_{n+1}$ $B_{n+2}$ $B_{n+3}$, &c., are blocks on a line in which the cars travel to the right, for which the contacts are effected as before, $B'_n$ $B'_{n+1}$ $B'_{n+2}$ will be the blocks for the line on which the cars travel in the opposite direction, for which the contacts are also effected as before, Fig. 11. This has nothing peculiar about it; but supposing that lines have to be brought into a single line the block $B_{n+1}$ coincides with the block $B'_{n+3}$, the block $B_{n+2}$ with the block $B'_{n+2}$, and the block $B_{n+3}$ with the block $B'_{n+1}$, and that a car going, say, to the right comes near these blocks. The switches which are actuated when going in this direction will act in a regular manner; but the block $B'_{n+3}$ will be excited, and in order to stop the current from circulating in this block it will be necessary that the block $B'_{n+4}$ be brought into circuit; but as the car goes in the opposite direction this block $B'_{n+4}$ will not come into circuit, and the current will permanently remain in the block $B'_{n+3}$. The block $B'_{n+2}$ will come into circuit at the passage of the car, for the block $B'_{n+3}$ being in circuit the electromagnet $E'_{n+2}$ will not be connected to earth and will not attract its armature; but the block $B'_{n+1}$ will attract its armature and remain in circuit, and so on. The result of the passage of the car, which takes place in the direction of the arrow, will be to leave one block of the two in circuit in the direction to the left. To prevent these blocks from coming into circuit, it is sufficient to prevent the corresponding electromagnets from being connected to earth. To this end the electromagnets $E'_{n+2}$ $E'_{n+3}$ $E'_{n+4}$ instead of being connected to earth directly are connected to a common cable, which is connected to earth at desired moments, as will be hereinafter described. When the same reasoning is applied to a car coming toward the left, it may be concluded that everything will happen in the blocks $B'_n$ $B'_{n+1}$, &c., in the usual manner, but that one block in each two will remain in circuit in the right-hand direction. To prevent these blocks from coming into circuit, it will be sufficient to prevent communication of the corresponding electromagnets to earth. For this purpose the electromagnets $E_{n+2}$ $E_{n+3}$ $E_{n+4}$ instead of being directly connected to earth are connected to a common cable, which will be connected to earth at desired moments, as will be hereinafter described. The matter stands, therefore, as follows: The two directions of travel have each a separate mechanism, and they have both in common the blocks $B_{n+1}$ and $B'_{n+3}$, $B_{n+2}$ and $B'_{n+2}$, $B_{n+3}$ and $B'_{n+1}$, and besides the blocks $B_{n+2}$ controlling the block $B_{n+1}$, $B_{n+3}$ controlling the block $B_{n+2}$, and $B_{n+4}$ controlling the block $B_{n+3}$ instead of being permanently connected to earth are connected to a common contact P, Fig. 11. In the same manner the blocks $B'_{n+2}$ controlling the block $B'_{n+1}$, $B'_{n+3}$ controlling the block $B'_{n+2}$, and $B'_{n+4}$ controlling the block $B'_{n+3}$ instead of being permanently connected to earth are connected to a common contact P'. The two contacts P and P' form a reversing-switch, the lever of which, provided with a soft-iron armature $x$, is connected to earth. According as this armature is on one side or on the other, either the contact P or the contact P' will be connected to earth. The armature $x$ is located between two electromagnets $c$ $c'$ with fine-wire coils. The first one on the side P is connected on one side with the earth and on the other side with the block $B_n$. The second one on the side P' is connected on one side to earth and on the other side to the block $B'_n$. From the preceding it will be easy to understand what occurs. Suppose a car is traveling to the right. Before it enters the common part of the line the block $B_n$ comes into circuit. The electromagnet C attracts its armature to the side P and connects the blocks $B_{n+2}$ $B_{n+3}$ $B_{n+4}$ to earth, so that the car will continue its travel without the blocks $B'_{n+1}$ $B'_{n+2}$ $B'_{n+3}$ being affected, as the connection with the earth is interrupted and therefore they cannot become excited. When another car comes after the first one, the same thing happens again. In case of a car going to the left before it reaches the common portion of the line the block $B'_n$ comes into circuit. The electromagnet C' attracts the armature to the side P' and connects the blocks $B'_{n+2}$, $B'_{n+3}$, and $B'_{n+1}$ to earth, so that the car also in this case can continue to travel without disturbing the blocks $B_{n+1}$, $B_{n+2}$, and $B_{n+3}$, as they have now no connection with the earth. It follows that in whichever direction the car travels when reaching the common portion the correct travel of the car will not be affected.

In practice the blocks $B_{n+1}$ and $B'_{n+3}$, $B_{n+2}$ and $B'_{n+2}$, and $B_{n+3}$ and $B'_{n+1}$ are respectively combined into one apparatus, and a single switch device C is placed near the line, as shown in Fig. 12. In case a line branches off into two the block $B_{n+1}$, Figs. 13 and 14, being the last block common to the two lines, the car, according to whether the points are placed in one or other position, will touch one of the two blocks $B_{n+2}$ $B'_{n+2}$, which, either one or the other, will come into circuit. The excitation of either of these blocks must therefore cause the connection of the electromagnet $E_{n+1}$ of the block $B_{n+1}$ with the earth to be interrupted. For this purpose the wire of this electromagnet may pass through the block $B_{n+2}$; but this block instead of being directly connected to the earth is connected to the block $B'_{n+2}$. In other words, the two devices for interrupting communication of blocks $B_{n+2}$ and $B'_{n+2}$ to earth are placed in series, so that whenever either of the blocks becomes operative the connection to earth is broken, and there will be no current in the block $B_{n+1}$. In the case of two lines merging into one, Fig. 15, it will be sufficient to connect the wires of the electromagnets $B_{n+1}$ $B'_{n+1}$ in parallel and to bring them to $B_{n+2}$, as if there were only one single block. When the block $B_{n+2}$ comes into circuit, it will break the earth communication of the two blocks $B_{n+1}$ and $B'_{n+1}$ from whichever side the car arrives.

It is of the greatest importance to prevent an accidental connection of one of the blocks with the source of electricity; but this might happen by a shunt-circuit on the surface of the ground if the latter were damp. To prevent this, each block may be placed in the center of a metallic casing 21, Fig. 16, of any suitable shape, said casing being insulated from the contact and permanently connected with the pole of opposite polarity to that which could unduly excite the block. In this way the current which might pass on the surface of the ground will be stopped before entering the block by the metallic casing 21, as by a screen. It is evident that it will be necessary to arrange the contact-piece so that it can pass over the block without touching the metallic casing. It is sufficient for this purpose that the block projects somewhat above the metallic casing. A practical arrangement would be to place the block in a metallic box, from which it is suitably insulated, the box being then suitably connected with the desired pole.

As has been stated before, the present system may be just as well applied to overhead as to underground lines. Fig. 17 indicates the modifications which have to be made so as to apply the present system to overhead lines. In this system the line is divided in insulated portions of any desired length, each portion being connected by means of a switch with an insulated feeder placed in the ground. Owing to this arrangement each portion will be excited only at the moment when the car passes. It will of course be necessary that the space between two consecutive sections be small enough and the contact in this case placed on the car large enough to enable said contact to touch during an appreciable time, as short as desired, the two consecutive sections at once—that is to say, the one it is going to leave and the one it is going to pass over. To cause the contact to touch two consecutive sections in this manner, the following arrangement may be made: The two wires 22 and 23, Fig. 18, of two consecutive sections terminate opposite each other and overlap in the same horizontal plane for a distance of, say, twenty to forty centimeters. They are held by a metallic connection 24, arranged so as to connect them to each other mechanically, but at the same time they are electrically insulated from each other. In this way when the wheel of the contact-piece or trolley arrives it will be obliged to touch during an appreciable time both wires at once, and the switch devices will act.

Fig. 19 shows another arrangement when the cars always travel on the line only in the direction indicated by the arrow. The ends 25 and 26 of the wires of each section are mechanically strongly connected together by means of rods 27 and 28, bells 29 and 30, and an insulator 24 or by any other means. At the point 26 is hinged a metallic part 31, which by turning about said point can bear against the point 25. The points 25 and 26 can therefore be electrically connected. It will now be easy to see what happens. When the trolley-wheel arrives along the wire 23, it raises the part 31, which establishes an electric connection between the two sections. These two sections will remain connected during the whole of the time the trolley travels between the points 25 and 26, and when the trolley has passed beyond the point 25 the part 31 will automatically fall, thus breaking contact between the two sections.

Fig. 20 shows an arrangement enabling the same result to be obtained with a trolley going in either direction. At the points 25 and 26 are hinged two parts, each consisting of two arms. The arms 31 and 31' are conductors and can be placed so as to touch each other with their faces, so that when they are in such position the current can pass from 25 to 26, as before. The arms 33 and 34 normally lie in the continuation of the wires 22 and 23. Finally, at the points 35 and 35' are fixed two small insulated links 36 and 36', which are pivoted together at the point 37. The pivot 37 is guided so as to be movable only in a vertical direction by means of a rod 38, guided in an orifice in the insulator 24. Supposing now that the trolley-wheel arrives along the wire 22, it meets the arm 31', which it raises. This arm at the same time raises the point 37, which in turn takes with it the arm 31, and the two faces 32 and 32' come in contact. The trolley passes on, and until it reaches the point 26 the faces 32 and 32' remain in contact. Having reached the point 26, the trolley meets the arm 34, which has been lowered, and raises it. This operation causes the parts 31 and 31' to separate and the communication between the points 25 and 26 to be broken. If the trolley arrives along the wire 23, the operation is the same.

Having thus described in a general way the whole of the different parts of my system of electric traction, I will now describe them in detail.

The blocks used in the system of electric traction according to the present invention consist of a cup made of cast-iron or any other conductive metal of sufficient strength. This cup 39, which is rectangular outside, has in its center a circular projection 40, Figs. 21 and 22. Another cup 41 is placed in this one in an inverted position and is of such shape that all points of its surface are at the same distance from the corresponding points of the cup 39. Between the two cups is placed insulating material 42 of sufficient strength—such, for instance, as mineral cement, substances similar to vulcanized rubber, &c. The surfaces of the cups 39 and 41 placed opposite each other are provided with recesses, so that when once the insulating material has been put in place it is impossible to separate the cups. In the center of the block constructed in this way there is left a passage 43 for the wire supplying current to the cup 41. This wire is cemented to a screw-threaded hole 44 and held there by a washer 45 and by two other washers 46 47, one of which forms a lock-nut. Of course the wire may be also fixed in any other suitable manner.

The upper surface of the cup 41, which is of cast-iron, would wear out very quickly. To prevent this, it may be covered with a steel or even cast-iron plate 48, firmly secured by a strong bolt 49. Moreover, between the plate 48 and the cup 41 is interposed a sheet or plate of lead 50, which being strongly compressed fills up the uneven spots on the surface of the metal, thus making it bear equally over its whole surface.

Of course the blocks thus constructed may be applied to all electromagnetic systems with detached conductors. They can also, if the potential be low, be used for the permanent passage of the current.

Instead of making the blocks square they may be made rectangular and even elongated, so that they have the appearance in the nature of slides.

In the system of electric traction according to the present invention the rails are used, as has been already mentioned, as a return. It is therefore necessary to establish electric connection between the ends of the rails.

The exciting or bringing into circuit of the different blocks placed in the ground is effected, as has been said before, by means of the contact-piece arranged on each car. This contact-piece is chiefly constituted by two similar parallelograms 61 62 63 64 and 61' 62' 63' 64', Fig. 23, but placed in different longitudinal planes, the distance (62 62') between the two planes being about double the thickness of a contact. (The length P P' is exaggerated in the drawings to make it clearer.) Powerful springs 65 and 65' always tend to open the parallelograms. The two contact-pieces are electrically connected. It is easy to understand now how they operate. If all the contact-blocks are exactly on the same level, the contact-pieces will always remain parallel to the contact-blocks. They will never touch the ground and will always arrive tangentially above each contact, against which they will not strike. If, on the contrary, as in Fig. 24, one contact-block P' is lower than the preceding one P, the slide or contact-piece 61 62 will drop on the contact-block P', while the slide 61' 62' will still be on the contact-block P, so that the current will not be interrupted. Of course instead of two parallelograms a greater number may be used. The contact-piece may also be made as follows: The two slides 61 62 and 61' 62', Fig. 25, are also hinged by means of links, but the links 61 63 and 62 64 are inclined toward the front, for instance, the links 63 61' and 64 62' being inclined toward the back. Moreover, the slide 61 62 carries a rod 66 67, and the slide 61' 62' a rod 66' 67', said rods being at a distance from each other and being connected by a spring 68, which tends to draw them together. It is easy to see what happens. The points 66 and 66' tend to come together, and consequently to bring the two links hinged at the points 63 and 64 together. The points 61 61' and 62 62' describe arcs of circles, and consequently tend to come nearer to the ground. The two slides 61 62 and 61' 62' will therefore be drawn equally toward the ground, as if they were independent. It may also happen that it is necessary to have the contact-pieces one behind the other, which must be maintained at different potentials. When the length is sufficient, it is easily effected, but it may be that this will be impossible. Then the following arrangement, (shown in Fig. 26,) may be adopted: The slide 61 62 is divided into three parts 61 70 71 and 71 62. These three parts are mechanically connected by means of an insulating part 73 and metallic parts 74 74, so as to form a rigid whole, the two parts 61 70 and and 72 62 being electrically insulated. The intervals between the points 70 72 and the part 71 are smaller than the width of one contact, and the width of the part 71 is nearly equal to that of one contact. Owing to this arrangement, the whole length of the contact-piece will pass from 61 to 62 without jar, and the contact will be successively connected to the parts 61 70 and 72 62 without these parts communicating with each other. Insulating-pieces 75 insulate the links, and the wires 76 connect the parts of the contact-piece to suitable points. This arrangement may also be used for contact-pieces of other construction.

As has been said before, the system of electric traction according to the present invention comprises switch devices which may be of any suitable construction; but the following arrangement (shown in Figs. 27 to 38) is more especially suitable for the purpose: The switch consists, chiefly, of a coil 80, divided into several sections. In the example illustrated in the drawings these are only the sections 81 82, Fig. 27, but of course this number may be varied. The object of this arrangement is to enable the same apparatus to be used for different voltages without changing its construction, simply by connecting the sections in different ways. The sections may be grouped for this purpose either in series or in parallel or in combinations of the two methods. In the coils 80, wound in the manner described, there is a soft-iron core 83, secured to the end of a lever 84, pivoted at the points 85 and 86, Fig. 28. The lever 84 has near its pivot 85 and 86 two parallel tongues 87 and 88, forming a shackle. At the end of each of these tongues there is a hole 89 90, Fig. 28. These two holes 89 and 90 receive the extremities of a spindle 91, parallel to the pivot 85 86. The spindle 91 is provided with a projection 92, Figs. 27 and 28, which is divided into two parts, one serving as a heel 93 and the other as a bracket or support 94. On the bracket or support 94 is placed an insulating-piece, on which is fixed a bent part 96. The lever 84 carries about its middle an insulating-piece 97, on which is fixed a C-shaped part 98. The ends of the parts 96 and 99 are vertical and covered with caps 100 and 101. Each cap 100 and 101 has two arms provided with disks. In Fig. 30, which is a plan view, certain parts being removed, the two arms 102 and 103 of the lower cap 101 are shown. These arms support disks 104 and 105. In Fig. 27 is represented one arm 106 of the cap 100. This arm is bent downward and supports the disk 107. Over the disks 107 and 108 of the part 100 are fixed two carbon cylinders 109 and 110. Under the disks 104 and 105 of the cap 101, which carry the carbons 114 and 115, are also secured two carbon blocks 111 and 112, resting on an insulating-disk 116. These carbons are fixed centrally by means of a screw which is screwed into the disk. This screw does not project from the faces of the cylinder, its head being sunk in a recess made for the purpose. In each cap 100 and 101 the surfaces of the disks which are to receive the carbon cylinders are well planed or smoothed and all in the same plane. Moreover, the carbons in each cap are all of the same thickness, so that in each piece the free surfaces of the carbons are flat and in the same plane. The construction of the pieces (or caps) 100 and 101 is such that when the carbons have once been put in place there is a stable equilibrium and these caps are easily maintained on the ends of the parts 96 and 99, which are formed with knife-edges. It will thus be seen that when the lever 84 and the projection 92 change their position, turning about their respective axes, (the lever 84 about the axis 85 86 and the part 92 about its axis 89 90,) the free surfaces of the carbons will always remain horizontal and consequently parallel. The spindle 89 90 is mounted so as to have a great amount of friction in the shackle 87 88 by means of springs 113, Fig. 30. In a plane above the carbons 109 and 110 of the upper disks are arranged two fixed carbon cylinders 117 and 118 of the same dimensions, supported by a disk 119 of insulating material. A screw 120, fixed in the sides 87 and 88, Figs. 27 and 28, can strike against the heel 93, which, as has been said before, is a part of the projection 92. A second screw 121 on the part 122, secured on the disk 116, can stop at a given moment the heel 93, as will be hereinafter described when describing the working of the apparatus.

All parts of the apparatus are held between two side plates 123 and 124, provided with holes of suitable shape, with which engage the various parts to be fixed. Owing to its construction the whole apparatus may be taken to pieces by removing the side plates.

Normally when there is no current in the coil 80 the lower movable carbons 114 and 115 rest on the fixed carbon cylinders 111 and 112. All the weight of the movable parts (core 83 and lever 84) presses the carbons 114 and 115 strongly against the carbons 111 and 112 by means of an adjustable stop 125, secured to the part 98. This arrangement insures a perfect contact and enables, besides, the lowering of the core 83 to be regulated as desired by suitably moving the part 125. When the lower carbons are in the position just indicated, the movable upper carbons 109 and 110 do not touch the fixed carbons 117 and 118. In the position just described the heel 93 bears against the end of the screw 121 and the screw 120 is out of contact with it.

The main object of the working of the apparatus is to bring in contact the upper carbons 109 and 110 with the fixed carbons 117 and 118 and to afterward raise the lower movable carbons 114 and 115 in order to separate them from the fixed carbons 111 and 112.

The working of the apparatus is as follows: As soon as current enters in the coil 80 the core 83 is attracted. The lever 84 turns about its axis 85 and 86, the part 98 following this movement; but the end 99 does not immediately cause the lower cap 101 also to move, owing to the clearance between said end 99 and the part 125; but, on the other hand, the part 92, not meeting with any resistance, immediately follows the movement of the lever 84, owing to the friction before referred to. By the movement of the part 92 the upper movable carbons 109 and 110 are raised and come in contact with the fixed carbons 117 and 118; but the arrangement is such that in this first position which they occupy their axes do not coincide. At the moment of meeting of the upper carbons or a little afterward the end 99 of the part 98 comes in contact with the cap 101, and the movement of the core 83 continuing the disks 104 and 105, carrying the carbons 114 and 115, will be raised, and the latter will no longer be in contact with the fixed carbons 111 and 112. On the other hand, the part 92, finding a resistance in consequence of the meeting of the movable carbons 109 and 110 with the carbons 117 and 118, cannot rise any farther; but as it is mounted so that it can move with considerable friction on the lever 84 the latter can continue to rise, overcoming the frictional resistance, (as this friction is not great enough to resist the ascension of the core 83.) At this moment the spindle 91, secured to the lever 84, describes an arc of a circle about the axis 85 86. The shape of the parts is such that the arc of the circle described by the spindle 91 is practically parallel to the plane of contact of the upper carbons. Consequently the part 92 will be drawn the length of this arc, and the carbons 109 and 110, secured to the part 92, will slide on the carbons 117 and 118. This movement will continue till the screw 120 meets the heel 93. The part 92 should at this time describe an arc of a circle about the axis 85 86; but it cannot do so, as its movement is arrested by the resistance caused by the meeting of the carbons. The movement of the lever 84 is therefore stopped, and the result of the attraction on the core will simply be to strongly press the carbons 109 and 110 against the carbons 117 and 118. If, under the circumstances, the current ceases to circulate in the coil 80, the core 83 will descend, the lever 84 describing an arc of a circle around the axis 85 86, and the part 92 not meeting any resistance will follow the lever 84 in its movement owing to the friction between the two, and the contact of the upper carbons will be interrupted. The part 92 follows the movement of the lever 84 till the heel 93 meets the end of the screw 121. At this moment the part 92 ceases to turn about the axis 85 86, and its upper end moves approximately in a horizontal direction, so that the axes of the upper carbons come into their original positions. The lever 84 still descending, the lower carbons come in contact, and all the parts again return to their original positions.

As the switch must be capable of being very quickly replaced in case of any of its inner parts being broken, it is supplemented by a system of connections which will enable the switch to be removed and replaced by a new one without necessitating connecting and disconnecting the wires each time. Such connections are represented, by way of example, in Figs. 31, 32, 33, 34, and 35. Fixed plugs 130 131 132 133 134, Figs. 31 and 32, are connected in any suitable manner to fixed carbons and to the wires of the coil. Each of these plugs has preferably the form of pincers, as shown in Figs. 31; but of course they may also have any other suitable shape. These plugs are carried by the upper insulating-disk 119, before referred to. The switch having been placed into the box destined for the purpose and hereinafter described, the plugs 130 131, &c., are in front of the plugs 130' 131', &c., to which are permanently connected the wires, which are to be suitably connected to the switch. These plugs are supported in the box by an insulating-plate 140, secured to the box. A connector, consisting of series of double plates 130'' 131'' 132'', supported by a part 141 made of insulating material, Fig. 35, and provided with a handle 142, enables, when simultaneously introduced into the pincers 130 131, &c., on one hand, and into the pincers 130' 131', &c., on the other hand, communication to be established between the series of plugs of the plate 140 and those of the plate 119. The plates are connected two by two by a safety cut-out consisting of a lead fuse in the well-known manner, which depends, however, on the special application.

Instead of connecting the contacts directly by fusible connections, they may be connected in any other suitable manner, enabling the apparatus to be used, by simply changing the position of the lever, either for traveling in the reverse direction, or the destination of the apparatus to be changed.

By raising the handle 142 the switch will be switched out, and by pressing on the handle the plugs will be forced into the pincers and the switch placed in circuit, as shown in Fig. 28. The connector shown more clearly in Fig. 39 carries, as stated, two series of double plates 130'' 134'' and 130''' 134'''. These two series of double plates are arranged parallel with each other and extend on both sides of the partition or block 141, which carries them and which is partly traversed by the double plates. The plates referred to are connected together in the following manner: the plate 130'' with the plate 134''', plate 131'' with the plate 132''', plate 132'' with the plate 131''', plate 133'' with the plate 133''', and plate 134'' with the plate 130'''. On the other hand, the plug 130 is connected with the lower fixed carbon block 111 of the switch, the plug 131 is connected with the lower fixed carbon block 112, the plug 132 is connected with the wire of the coil 80, the plug 133 is connected with the upper fixed carbon block 117 of the switch, and the plug 134 is connected with the upper fixed carbon block 118. On the other hand, the plug 130' is connected with the contact-block corresponding with the switch under consideration, over which the contact-pieces carried by the cars pass. The plug 131' is connected with a lower fixed carbon block 112 of the switch, which will be the one shortly to be considered. The plug 132' is connected with the electromagnet 80 of the switch which directly precedes the one under consideration. The plug 133' is connected with the line. The plug 134' is connected with the return-wire. The parts being disposed as stated, it is presumed that the switch is in a state of rest—that is to say, the lower fixed carbons 111 and 112 are united by the movable carbons of the switch. It now remains to be seen what will take place when the contact-pieces of the car come in contact with a contact-block; but it must be remembered at the same time that the contact-piece of each car is so arranged that it can touch two adjacent contact-blocks at the same time. As soon as the contact-piece carried by the car arrives in contact with the block corresponding to the switch in question the current coming from the adjacent switch-block passes from there to the plug 130', to the plate 130''', to the plate 134'', to the electromagnet 80, to the plug 132, to the plate 132'', to the plate 131''', to the plug 131', and from thence finally to the fixed carbon block 112 of the following switch. The lower fixed carbon block 112 is at this moment connected with the lower fixed carbon block 111, which itself is connected to the return-wire. The electromagnet 80 of the switch under consideration is traversed by a current, its armature is raised, and the movable carbon blocks of the switch communicate with the fixed upper carbon blocks 117 and 118, so that lower carbon blocks 111 and 112 are disconnected. This operation can be readily seen from the diagram Fig. 34 and connects the contact-block of the switch directly to the line and not through the preceding contact-piece, but through the plug 133', plate 133'''', the plate 133'', plug 133, the carbon block 117, the carbon block 118, the plug 134, the plate 134'', the plate 130''', the plug 130', and finally through the contact-block. On the other hand, the same operation produces the breaking of the circuit of the electromagnet 80 of the preceding switch, so that the carbons 111 and 112 do not communicate one with the other, and so that the return-wire is no more in communication with the electromagnet 80 of the preceding switch. This electromagnet therefore releases its armature, and the current does not pass through the contact-block of the preceding switch, which was the one under consideration. By the connections which have been considered the contact of the car which arrives on the contact-block of a switch permits the current to pass through this contact-block and to cut through the contact-block of the preceding switch.

The switch, as described, permits the motion of the cars only in one direction. For permitting the quick motion of the cars in the opposite direction all that is necessary is to turn the connector so as to connect plug 130 to plug 134, plate 130''' to 134''', plug 130' to plug 134', and the plate 130'' to plate 134''.

From the diagram shown in Fig. 34 it will be seen that the terminal connections are not changed until the three intermediate connections are changed in such manner that all of the succeeding are applied to the preceding switch, and vice versa.

The switch is preferably placed inside of an air-tight box. (Shown in Figs. 36, 37, and 38.) The switch of the construction just described is placed inside this box, in which are fixed, at 143 and 144, lugs 145 and 146, Fig. 33, secured to the plate supporting the plugs 130' 131', &c., at which the wires terminate. The box is provided with a cover 147 and has a double oil-seal 148 149. Over the cover is placed a casing 150, resting on a circular support 151, cast on the box. Finally, the box, which is open at the bottom, is closed by a kind of spherical cap 154, the parts being so shaped that there remain openings 155 for the passage of the cables. When the cables are in place, the cap 154 is secured to the box by means of lugs 156, which are then bolted together. The casing thus formed is then filled with insulating material up to the line 157. The box is thus made perfectly air-tight in its lower part after the cables are passed through the same.

What I claim as new is—

1. In a system of electric traction, the combination of the feed-wire, contact-blocks, switches, four fixed contact-pins arranged in pairs on opposite sides of each switch, and electromagnets wound with fine wire and controlling the switches, one of said contacts for each switch being connected with the feed-wire; another contact being connected with the appropriate block, and both of said contacts being at one side of the switch; another or third contact being grounded, and the fourth contact being connected by the fine-wire coils of the preceding electromagnets with the block, said third and fourth contacts being arranged at the other side of the switch so that throughout the system the switches will be operated by a shunt from the main or feed wire, substantially as set forth.

2. In a system of electric traction, wherein the switches are operated by a shunt-current, the combination of two contacts, two electromagnets, a lever between the contacts and connected to ground, said lever carrying an armature located opposite the two electromagnets, a set of contact-blocks connected with one of the contacts, one of said blocks being connected by one of said electromagnets to ground, and another set of blocks connected with the other of said contacts, one of said blocks being connected by the other of said electromagnets, also to ground, so that the circuits of the coils of a certain number of the switches of the system are maintained in open condition on account of track-switches, crossings, or trains running in opposite direction on a track-section, substantially as set forth.

3. In a system of electric traction, wherein the switches are operated by a shunt-current, means applicable when a single track branches, the same consisting in placing in series, the two ground-circuit breakers of the first block of each section of the double track, in such a manner that whatever may be the block that is operated, the ground-circuit is broken and the current does not pass to the last block of the single track, substantially as set forth.

4. In a system of electric traction, a contact-block consisting of a cup provided with an interior hollow projection, a second cup provided with a cavity of suitable form, said second cup being placed over the first cup so that said hollow projection extends into said cavity, and insulating material interposed between the cups, substantially as set forth.

5. In a system of electric traction, a contact-block consisting of a cup provided with an interior hollow projection, a second cup provided with a cavity of suitable form, said second cup covering the first, and its cavity receiving said projection, insulating material interposed between the cups, and a cover-plate on the second cup, to which plate the electric conductor is connected, said conductor passing through the hollow projection of the first cup, substantially as set forth.

6. In a system of electric traction, a contact-block, consisting of a cup furnished interiorly with a hollow projection, a second cup having a cavity of suitable form and placed over the first cup, said cavity receiving said projections, insulating material interposed between the cups, a cover-plate on the second cup, and a layer or sheet of lead between the cover-plate and the first cup, the electric conductor passing through the hollow projection of the first cup and being connected with the cover-plate, substantially as set forth.

7. In a system of electric traction, a sliding contact, consisting of two pairs of arms pivoted to the car, and shoes pivoted to said arms so as to form two pivoted parallelograms arranged, one in advance of the other but sidewise of each other, and a single spring connecting the two parallelograms, substantially as set forth.

8. In a system of electric traction, a sliding contact provided with a shoe divided into three parts, united mechanically and insulated from each other, the distance which separates the central part from the other two being less than the width of a contact-block, and the two outer parts being each connected by a wire to the points of consumption of the current upon the car, substantially as set forth.

9. In a system of electric traction, a switch for the operation of each block or group of blocks, consisting of two groups of four carbon contacts each, two of the contacts of each group being fixed, and the others movable, and means for causing the movable contacts of the upper group to come in contact with the corresponding fixed carbons before the lower movable carbons leave the corresponding fixed carbons, the upper movable carbons then sliding along the corresponding fixed carbons while forcibly pressing against them, substantially as set forth.

10. In a system of electric traction, a switch for operating the blocks of the same, consisting of two groups of four carbon contacts each, two contacts of each group being fixed and two movable, a divided coil, a core of soft iron movable in the same, an oscillating lever supporting said core, and carrying a cap provided with two arms by which the lower movable carbons are in turn carried, and a projecting part on said oscillating lever abutting against said cap when the core enters the coil, a certain play existing between the projecting part and the cap, in order that the elevation of the lower movable carbons shall not take place until after a certain amount of upward movement of the core, substantially as set forth.

11. In a system of electric traction, a switch for operating the contact-blocks of the same, consisting of two groups of four carbon contacts each, two contacts of each group being fixed and two movable, a divided coil, a core moving in the same, an oscillating lever supporting the core, a part frictionally connected with said lever and provided with a suitable support, and a cap having arms supporting the two upper movable carbons, said frictional part being carried along by said lever when the core enters the coils as long as it does not encounter any resistance capable of overcoming the strong friction, and lifting the said two upper movable carbons so that they come in contact with the corresponding fixed carbons, and said friction part, being then unable to rise further, then describing an arc of a circle, whereby the said upper movable carbons are caused to slide along the fixed carbons, substantially as set forth.

12. In a switch, a connector comprising a supporting-frame and metallic plugs or pins thereon, and two series of pincers, of which one series is suitably connected to the fixed carbons and to the wires of the coils, and the other series is suitably connected to the line-wires, the insertion of the connector bringing the switch in circuit and the withdrawing of the same bringing the switch out of circuit, said connector being adapted to be turned end for end so that it is possible to use the same switch for the movement of the car in opposite directions, substantially as set forth.

13. A switch-containing box, consisting of the box-body in which the switch is placed, said box-body being provided with a ledge, a cover, a double hydraulic seal between the cover and the box-body, and a casing resting on said ledge, substantially as set forth.

In testimony whereof I have signed this specification in the presence of two subscribing witnesses.

EDOUARD VEDOVELLI.

Witnesses:
EDWARD P. MACLEAN,
ANTOINE ROUSSANNAL.